United States Patent [19]

Hill

[11] 4,339,230
[45] Jul. 13, 1982

[54] BIFOIL BLADE

[75] Inventor: Paul W. Hill, Cumberland, Md.

[73] Assignee: Hercules Incorporated, Wilmington, Del.

[21] Appl. No.: 142,598

[22] Filed: Apr. 22, 1980

[51] Int. Cl.³ .............................................. B64C 11/26
[52] U.S. Cl. .................................... 416/226; 416/230
[58] Field of Search ................ 416/226, 230 A, 229 R

[56] References Cited

U.S. PATENT DOCUMENTS

| | | | |
|---|---|---|---|
| 2,694,458 | 11/1954 | Stevens | 416/229 X |
| 3,028,292 | 4/1962 | Hinds | 416/230 A X |
| 3,476,484 | 11/1969 | Brunsch | 416/230 A |
| 3,586,460 | 6/1971 | Toner | 416/230 A X |
| 3,713,753 | 1/1973 | Brunsch | 416/226 |
| 3,962,506 | 6/1976 | Dunahoo | 416/226 X |
| 3,967,996 | 7/1976 | Kamov et al. | 416/230 A X |
| 4,079,903 | 3/1978 | Ashton et al. | 416/226 X |
| 4,081,220 | 3/1978 | Andrews | 416/226 |
| 4,213,739 | 7/1980 | Euler | 416/226 |
| 4,278,401 | 7/1981 | Martinelli | 416/230 |

FOREIGN PATENT DOCUMENTS 1036064 8/1958 Fed. Rep. of Germany ...... 416/233

*Primary Examiner*—Everette A. Powell, Jr.
*Attorney, Agent, or Firm*—Edmund C. Ross, Jr.

[57] ABSTRACT

A bifoil blade structure useful for various aerodynamic blade applications is disclosed wherein internal support is provided by a unidirectional integrally wound fiber composite channel spar comprising at least two unidirectional fiber composite channels extending from the root end to the tip end of the blade. These channels each contain two unidirectional fiber composite bars joined by a fiber composite channel web.

10 Claims, 18 Drawing Figures

BIFOIL BLADE

SUMMARY OF THE INVENTION

The present invention relates to a bifoil blade structure suitable for a number of aerodynamic blade uses, including wind-powered turbine generators and the like, as well as helicopter blades and blades for the generation of wind. In particular, the present invention relates to a bifoil blade wherein the internal support is provided by a unidirectional integrally wound fiber composite channel spar composed of at least two unidirectional fiber channels which extend from the root end to the tip end of the blade and each comprise two unidirectional fiber composite bars joined by a fiber composite channel web.

BACKGROUND OF THE INVENTION

Bifoil blades have both an airfoil-shaped upper surface and an airfoil-shaped lower surface, they may be constructed in various shapes and sizes and may be used for many aerodynamic applications. Many factors are important in judging the utility of a bifoil blade for a given aerodynamic application. Probably the most important of such factors are the weight of the blade, the strength of the blade and the simplicity and economy of its construction.

One of the applications for which the present invention is particularly useful is that of a wind blade. Windmills and wind-powered equipment have been known since ancient times, but until relatively recently, little emphasis has been placed on the economic development of such systems. Now, largely because of the rising cost of energy derived from fossil fuel sources and the uncertainties and possible dangers involved in nuclear sources, thought is being given to the development of a wind-powered turbine generator which would be competitive with other energy sources. For such a system to be efficient, it must utilize blades which are long, so as to sweep the greatest area, and they must be light. At the same time such blades must have substantial internal strength to withstand high wind and other potentially damaging forces.

U.S. Pat. No. 4,081,220 to Andrews shows a wind blade utilizing a composite fiber wound support member. The fiber wound support member of the Andrews blade is composed of multidirectional fiber which is wound on a removable mandrel or a nonremovable foam mandrel. This fiber wound support member forms the finished shape of the blade in the area of the blade tip. A trailing edge mandrel is attached directly to the fiber wound support member and the combined unit is then helically wound with fiber to produce the finished blade shape.

In other applications, such as a helicopter blade, stronger blades are required although they are generally shorter, but blade weight still remains a critical factor. Fiber composite windings have often been used in forming such blades. See, for example, U.S. Pat. Nos. 3,476,484 and 3,950,115, which, although they are chiefly concerned with blade root attachment means, show blades which utilize fiber composite windings. Likewise, U.S. Pat. No. 4,096,012 shows the fabrication of a rotor blade spar from fiber glass tape. It has long been known that layers of directional fiber will increase the strength of a blade. See in this regard, U.S. Pat. No. 3,768,760, which shows a blade covering of successive layers of directional fiber.

It is an object of the present invention to provide a bifoil blade for a given aerodynamic application which has the least amount of weight without sacrificing internal strength.

It is also an object of the present invention to provide a wind blade which is long, light and strong.

It is a further object of the present invention to provide a wind blade whose structural features and low cost will allow it to be used in a wind-driven power generation system which will be more competitive with other energy systems.

The foregoing, as well as other objects, features, and advantages of the present invention are pointed out with particularity in the claims annexed to this specification. Further, they will become more apparent in light of the following detailed description of the preferred embodiment thereof and as illustrated in the accompanying drawings.

According to the present invention, a bifoil blade is provided comprising an upper and a lower airfoil-shaped skin; means for joining the upper and the lower airfoil-shaped skins; said joinder of the skins forming the surface of the bifoil blade, a leading edge and a trailing edge for said bifoil blade; and a central support structure enclosed within said joined skins comprising at least two channels each comprising two unidirectional fiber composite bars and a fiber composite channel web joining said bars, said bars extending from the root of the blade to the tip of the blade, one bar of each channel being affixed to the inside surface of the upper airfoil-shaped skin and the other bar of each channel being affixed to the inside surface of the lower airfoil-shaped skin.

The present invention provides for the construction of a blade which is adaptable to various applications. Unidirectional fiber is known to provide the maximum strength in the direction of winding, and the present invention's array of four channels with two contacting the inside of the upper blade surface and two contacting the inside of the lower blade surface distributes this strength to best advantage. The channels, however, are not intended to form an independent structural unit capable of carrying all of the blade loads, but are intended rather to cooperate with the blade surface skin members and other possible cloth or wound composites, including integrally wound composites. Thus the present invention provides a blade achieving maximum strength with the minimum materials and, therefore, with the lowest weight.

DETAILED DESCRIPTION OF THE INVENTION

Figure 1:
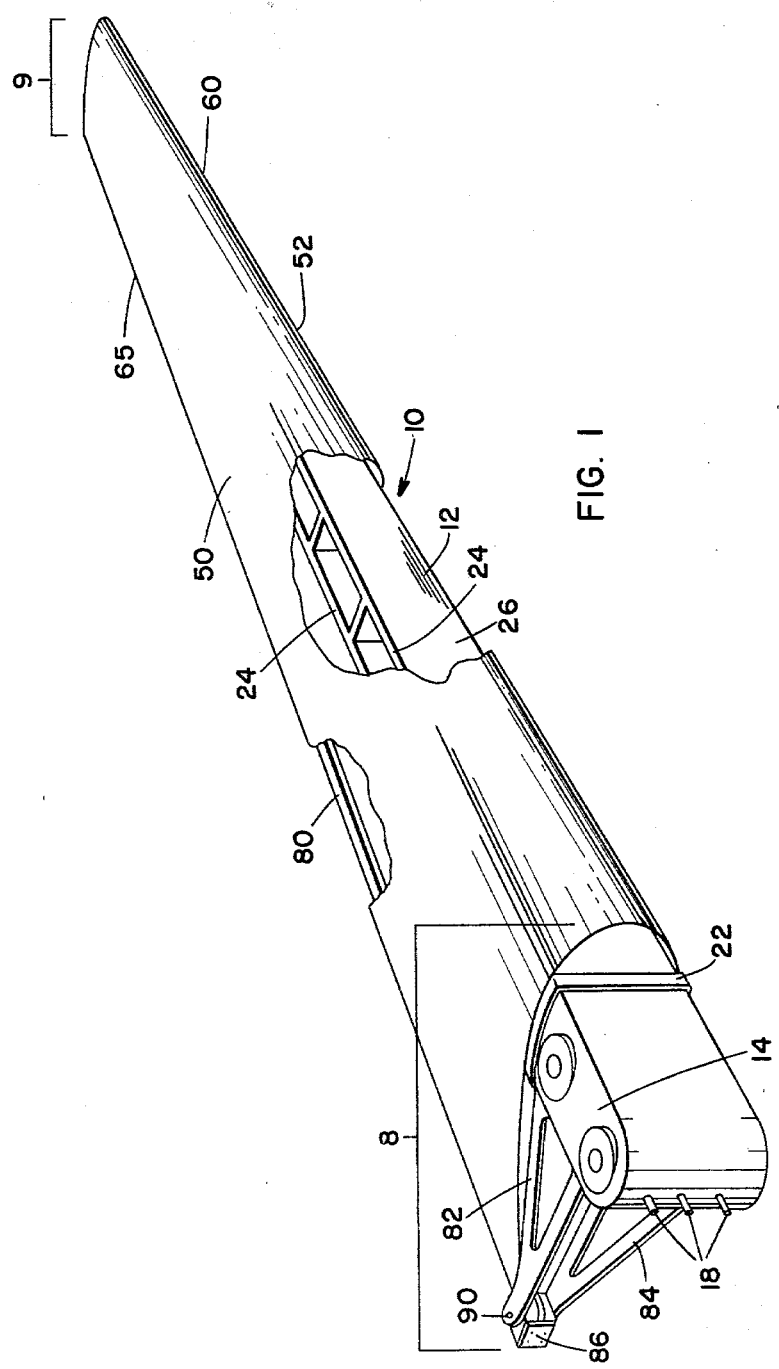
FIG. 1 shows a partially broken-away view of a typical blade of the present invention.

A typical bifoil blade of the present design is illustrated in FIG. 1, wherein the bifoil blade is composed of an airfoil shaped upper blade surface skin (50) and an airfoil-shaped lower blade surface skin (52), which may taper from the blade root area (8) to the blade tip area (9). These surface skins meet to form a leading edge (60) and a trailing edge (65). Internal to these surfaces, and providing support thereto, is a central support member (10) which, according to the teaching of the present invention, is constructed of at least two channels, each consisting of two unidirectional fiber composite bars (24), joined by a fiber composite channel web (26). This embodiment will be described more fully.

Figure 2:
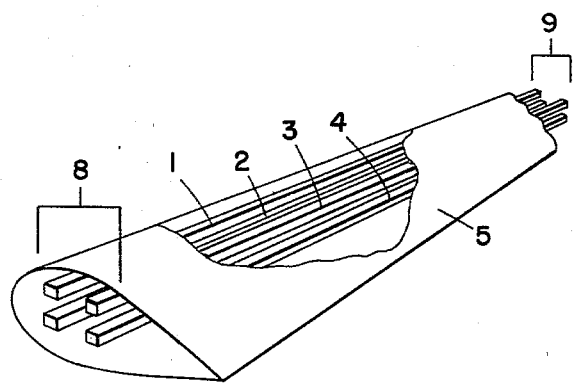
FIG. 2 shows a partially broken-away view of the blade of the present invention in its most basic embodiment.

To aid in understanding the preferred embodiment of this invention, the most basic embodiment of the invention is illustrated in FIG. 2. Shown in this diagram are four independent bars (1, 2, 3, 4), each of which is constructed of unidirectional fiber. These bars are joined together by laminated skin (5) to form a unitary structure. The four bars are shown as independent in the area of the blade root, shown as (8) in FIG. 2, and may be connected to a hub with any type of clamping means or other attachment known to the art. A blade of this basic design would not be useful where long blade or large blade loads were required, however, because the bars (1, 2, 3, 4) or the skin (5), or both, would have to be prohibitively thick and heavy in order to provide the required strength.

The wind blade embodiment of the present invention is constructed from a number of individual members which are assembled to provide an interconnecting and cooperating unit; each such individual member will be described more fully hereinafter.

A central support member (10) for the wind blade embodiment of the present invention is formed of a four-bar support system. The central support member (10) is a unidirectional integrally wound fiber composite channel spar as shown separately in FIG. 3A. This support member (10) is constructed of resin impregnated fiber filaments (12) unidirectionally wound in the bladewise direction, that is, along the length of the blade from the blade root to the blade tip. The fiber is wound around a blade attachment insert (14) and at least one removable cell forming member (15), shown in FIG. 4. Typically, additional removable cell forming members are each added sequentially in the course of the winding process to produce additional cells (16), each composed of two pairs of fiber composite bars (24) joined by a thinner fiber composite channel spar web (26).

When the channels are filament wound to form more than one box-like cell, each channel and the size of each successive cell may gradually taper from the blade root to the blade tip. This will result in a tapered spar which may range from 15 to 200 feet or more in length. It is intended that the taper of the central support member (10) will conform to a gradual tapering of the overall aerodynamic shape of the blade. In this manner also, the central support member (10) and the finished blade may be formed with a slight twist along the length of the blade, if such a twist would be advantageous in the specific application of the blade.

The fiber used to fabricate the spar may be wound directly over bolts (18) in a suitable blade attachment insert (14). Bolts (18) may be covered with protective caps (not shown) for protection during winding. After winding, these bolts (18) may be used to secure a compression cap (20) to the root end of the completed central support member (10) allowing the said compression cap (20) to be bolted and bonded in place, and cured with the completed central support member (10). Caul plates (not shown) may be placed on the wound fiber composite channel webs (26) to consolidate the support member (10) during cure. However, this step is not required for close tolerance dimensional control because the skin-bonding surfaces (28) of the support member are controlled by the design of the cell-forming members, shown as (15) in FIG. 4, which form the surface configurations of the cells (16) themselves. After the support member (10) is fully cured, the caul plates and cell-forming members are removed and a hoop tie (22) may be made on the support member outside of the blade attachment insert (14) to further strengthen the finished blade and help to resist wedging forces caused by the blade attachment insert.

In this manner, the central support member (10) is produced without the need of a full length mandrel and without the production difficulties associated therewith. Further, the attachment means for the support member, and for the entire blade itself as well, may be wound in place without the necessity of later cutting holes for bolts, or for providing other stress-concentrating elements.

Figure 5:
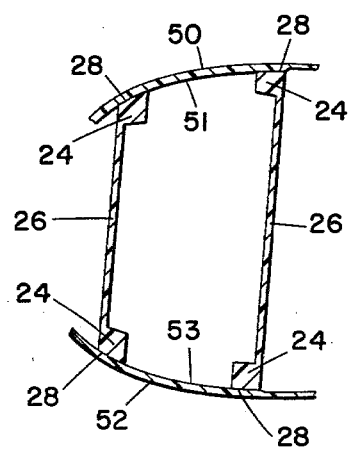
FIG. 5 shows a partial cross-sectional view of wind blade embodiment of the present invention showing the box-shaped support formed by the channel spar and the upper and lower skins.

In the wind blade embodiment described, the central support member (10) is 100% unidirectional composite and is designed to carry essentially the entire flatwise and edgewise fatigue forces alone, with little aid from the skin. These forces act in two essentially perpendicular planes. The support member (10) is efficient in resisting these moments because it has a cross-section, shown in FIG. 5, which is basically a box with a greater amount of material in each of the four bars (24), forming the box's corners, and connected by relatively thin sidewalls. These sidewalls are formed by the fiber composite channel webs (26) on two opposite sides of the box and portions of the upper airfoil-shaped skin (50) and lower airfoil-shaped skin (52) on the other two sides.

Referring again to FIG. 1, the upper airfoil-shaped skin (50) and a lower airfoil-shaped skin (52) are bonded to the central support member (10) and interconnect to form the aerodynamic shape of the blade and cooperate in the structural support of the blade. The bonding surfaces (28) on the bars (24) of the support member (10) are bonded to the inside surface (51) of the upper airfoil-shaped skin (50) and the inner surface (53) of the lower airfoil-shaped skin (52) such that a portion of each such said skin acts to join the two channel sections, forming a box-shaped structure.

Figure 6A:
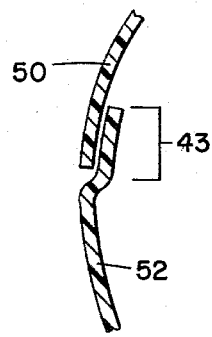
FIG. 6A, FIG. 6B and FIG. 6C show partial cross-sectional views of the leading edge junction of the wind blade embodiment.

Still referring to FIG. 1, the upper airfoil-shaped skin (50) and the lower airfoil-shaped skin (52) join to form a leading edge (60) and a trailing edge (65). The joined skins thus form an aerodynamic blade. The leading edge (60) is formed by overlapping the upper airfoil-shaped skin (50) and the lower airfoil-shaped skin (51) and bonding the said skins together at the overlap, shown as (43) in the cross-section illustrated in FIG. 6A. The amount of overlap decreases gradually in a tapered blade from the blade root to the blade tip. The bifoil skins may also be bonded together with a T-shaped connection, shown as (44) in FIG. 6B, or an H-shaped connection, shown as (47) in FIG. 6C, if more weight or more protection for the leading edge is desired.

Figure 6B:
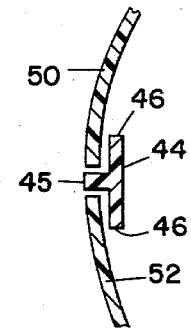
Figure 6C:
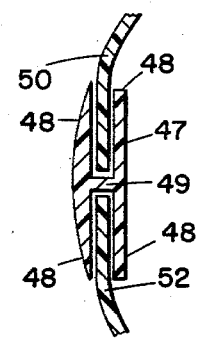

In the H-shaped connection shown in cross-section in FIG. 6C, elongated sides (48) are separated by a common wall (49) such that the sides (48) create two open pockets. The upper airfoil-shaped skin (50) and the lower airfoil-shaped skin (52) may be bonded between the two sides (48) comprising the pocket. The use of the T-shaped connection shown in cross-section in FIG. 6B provides the additional advantage that it can be used to provide additional bonding pressure in forming the leading edge of the blade (60). This may be done by providing means to grip the elongated leg (45) of T-shaped section and apply pressure from the outside of the blade to pull the elongated sides (46) against the inside surfaces of the upper and lower airfoil-shaped skins. Subsequently, this leg (45) should be trimmed flush to the blade's surface.

Figure 7:
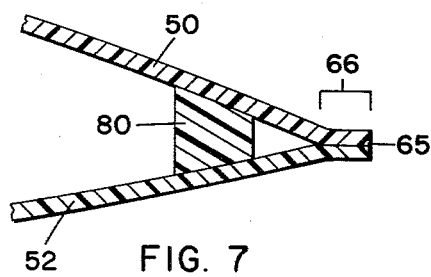
FIG. 7 shows a partial cross-sectional view of the trailing edge junction of the wind blade embodiment.

As shown in cross-section in FIG. 7, the upper airfoil-shaped skin (50) and the lower airfoil-shaped skin (52) each have a flattened section which are bonded to each other in a flange (66) to form a trailing edge (65), at the rear of the blade. The width of this flange (66) would also decrease in a tapered blade with the taper of the blade from the blade root to the blade tip.

Figure 8:
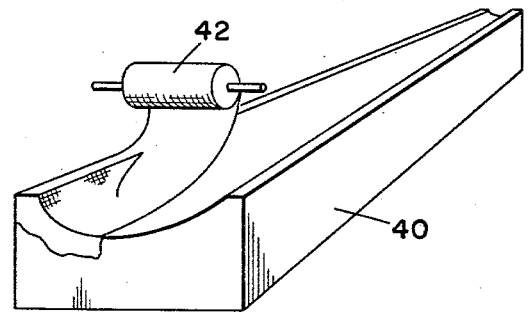
FIG. 8 depicts the method employed to mold resin-impregnated cloth or wide tapes into skins for the wind blade embodiment.

Both the upper airfoil-shaped skin (50) and the lower airfoil-shaped skin (52) are molded to shape in a laminating process in which layers of the resin-impregnated cloth or wide tapes (42) are placed into a mold (40), as illustrated in FIG. 8. This process is well-known and is used commercially in other construction, such as boats and sail planes. Since the skins are molded in this manner, there is no mandrel and no costly winding process; in addition, the dimensions and weight of the skins can be controlled exactly by pre-weighing the materials. The skins can be fabricated from plies of glass fiber reinforcement and epoxy. For example, three layers of reinforcement could be used in the area of the blade root, two layers in the center section of the skin, and one layer could be employed in the area of the blade tip. Preferably, the thickness of the reinforcement, and the resulting skin, also vary in the chordwise direction. This will result in a surface skin which is preferably thicker in the area of the leading edge (60) and gradually tapers to a smaller thickness at the trailing edge (65).

The thickness of each skin, and therefore its strength, will determine the need for a trailing edge spline and/or stiffeners. These become advantageous as the weight of the skin increases with the blade length and area.

Figure 9:
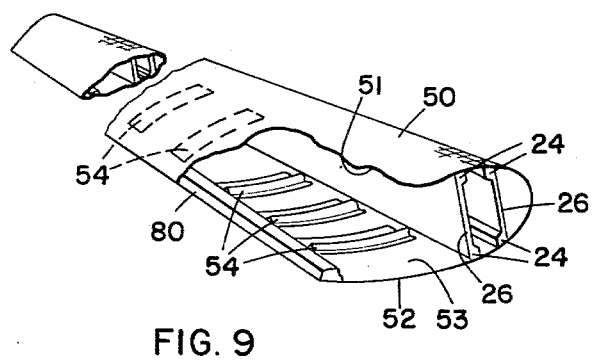
FIG. 9 shows a partial break-away view of the wind blade embodiment of the present invention.
Figure 10:
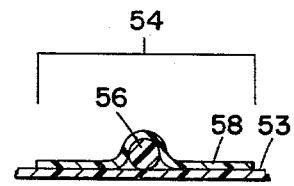
FIG. 10 shows a cross-sectional view of the stiffeners used on the inside of the laminated skins.

For relatively short blade sizes, for example, those about 60 feet in length or less, a trailing edge spline may not be necessary to maintain an acceptable skin strain level under edgewise fatigue loading dependent on the precise application for the wind blade. On the other hand, at blade lengths in excess of about 60 feet, a trailing edge spline is frequently required, and it is also advantageous to employ stiffeners to the cloth laminate bifoil skins. These stiffeners, shown as (54) in FIG. 9, are affixed to the inner surface (51) of the upper airfoil-shaped skin (50) and the inner surface (53) of the lower airfoil-shaped skin (52). The stiffeners (54) may be attached solely to the inner surfaces (51) and (53), or they may also interconnect with and cooperate with either the central support member (10) or the trailing edge spline, shown as (80), or both. Said stiffeners (54) are themselves easily fabricated by using a material such as cloth laminate. As shown in cross-section in FIG. 10, stiffeners (54) are prepared from a forming member (56), preferably of a material such as foamed polyethylene, which is overlayed with a narrow strip (58) of the epoxy-impregnated cloth material. Preferably, the strip (58) contacts the inside skin surface (53) on each side of the forming member (56) for a distance equal to approximately twice the diameter of the forming member (56). In a tapered blade, the forming members (56) should decrease in diameter gradually from the blade root to the blade tip, so the width of the cloth strips (58) would also decrease.

The trailing edge spline, shown as (80) in FIG. 1, assumes increasing importance as blade size increases, particularly beyond a blade length of 60 feet or so, where it is only marginally necessary. In larger blades the spline is necessary to maintain an acceptable cloth skin strain level under edgewise fatigue loading.

The trailing edge spline is made of a unidirectional fiber-reinforced composite. Such a spline does not require a mandrel and can be formed by a mechanized process which impregnates the fiber rovings and lays them into a form. The form would control the finished dimensions of the spline. When the finished winding is cured and removed from the form, it has a trapezoidal shape. In a tapered blade, the cross-sectional area of the spline gradually decreases from the blade root to the blade tip.

Figure 11:
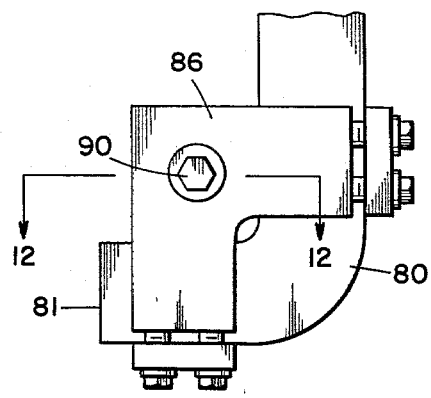
FIG. 11 shows the saddle clamp used to connect the trailing edge spline.
Figure 12:
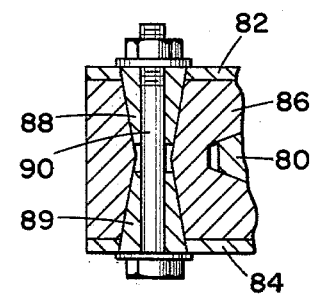
FIG. 12 shows a partial cross-sectional view taken along the lines A—A of FIG. 11.

Still referring to FIG. 1, the trailing edge spline (80) is interconnected to the blade attachment insert (14) by an upper drag link (82) and a lower drag link (84) in the finished wind blade. These drag links can be economically constructed from flat metal. The upper drag link (82) and the lower drag link (84) are connected at the rear edge of the blade by bolt (90) and enclose a saddle clamp (86) shown in enlarged view in FIG. 11. The saddle clamp (86) holds the spline end (81) rigidly and without the necessity of a direct connection which would require drilling, or the like. Tapered bushings (88) and (89) shown in partial cross-section in FIG. 12 can be used to surround the bolt (90) and these assist in protecting against bolt fatigue.

Figure 13:
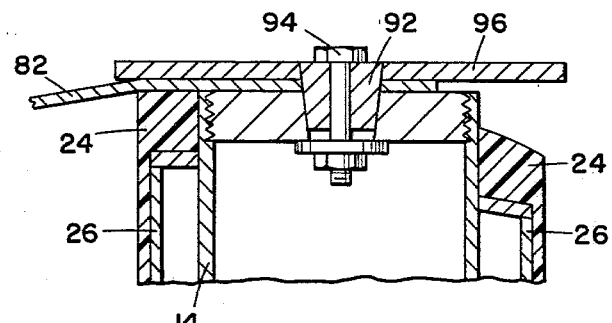
FIG. 13 shows a partial cross-sectional view of the root end of the blade of the present invention.

A similar attachment means is employed to join the upper drag link (82) and the lower drag link (84) to the blade attachment insert (14), as shown in partial cross-section in FIG. 13. The upper drag link (82) contacts the upper surface of the blade attachment insert (14) and is connected by a bolt (94) through a tapered bush (92). The bolt and bush are also intended to join a contemplated blade attachment means, shown as (96), joining the blade to a central hub.

Figure 14:
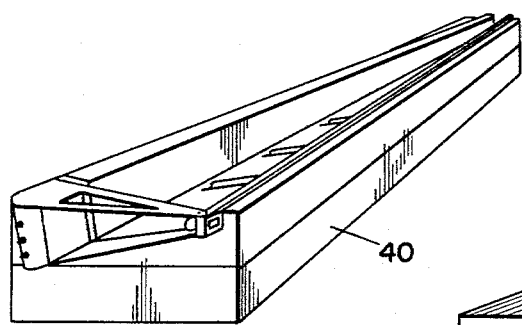
FIG. 14 and FIG. 15 depict stages in the assembly of the wind blade embodiment of the present invention.
Figure 15:
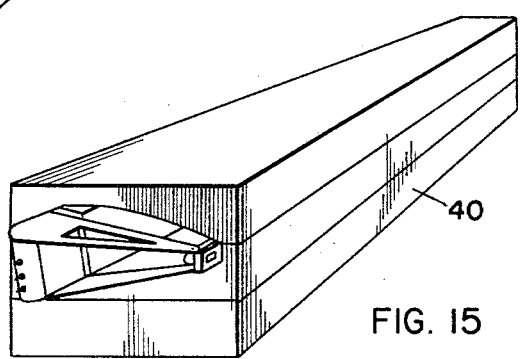

FIG. 14 and FIG. 15 illustrate stages of assembly of the blade of the present invention, which is assembled in the following fashion. Stiffeners (54), if necessary, may be attached to the inner surface (51) of the upper airfoil-shaped skin (50) and the inner surface (53) of the lower airfoil-shaped skin (52) while each said skin is still in its mold (40), then the central support member (10) and trailing edge spline (80) are attached to the inner surface (53) of the lower airfoil-shaped skin (52) and the saddle clamp (86) and drag links (82) and (84) are attached to interconnect the support member (10) and spline (80). The assembly at this stage is shown in FIG. 14. After the attachment points are prepared, the second skin, still in its mold, is placed over the assembly as shown in FIG. 15, and the molds are pressed together while bonding is effected. The blade is then released from the molds, foam weather seals are inserted into the blade openings and a protective coat is applied to the outside surfaces.

In general, several composite materials are available for commercial filament wound composite applications; these are: E-glass, S-glass, Kevlar, carbon and graphite. E-glass is currently the preferred fiber material. E-glass, because of its lower cost and adequate performance, is also the fiber of choice for the cloth laminate.

Any polymeric resin system which cures to a rigid polymer may be used as the binder or matrix. Although thermosetting epoxies are preferred, thermosetting polyesters and vinyl esters or any thermosetting plastic polymer capable of imparting necessary strength to the cured composite structure may be used. The resin system may be applied to the fiber during winding, or the fiber may be pre-impregnated with resin. The various blade components may be bonded together using any structural adhesive generally used in bonding, although a specific choice may depend on the teachings of the art with respect to the expected environment of the blade.

In place of the flat fiber composite channel webs (26) shown, more sophisticated tooling would allow the fiber windings to periodically cross from one bar of the cell forming member to the other bar during winding. For uses where increased shear strength is necessary, complete advantage could be taken of this method. In such a channel spar, shown in FIG. 3B, each cell would have full cross- and diagonal-bracing of the channels. Such construction would provide substantially increased shear strength. The tooling to provide such a structure would be very costly, and would involve winding the fiber over movable mountings. However, for blade uses which require such great strength at minimal weight, and where cost is not as strong a consideration, such a sophisticated construction might be advantageous.

Figure 3A:
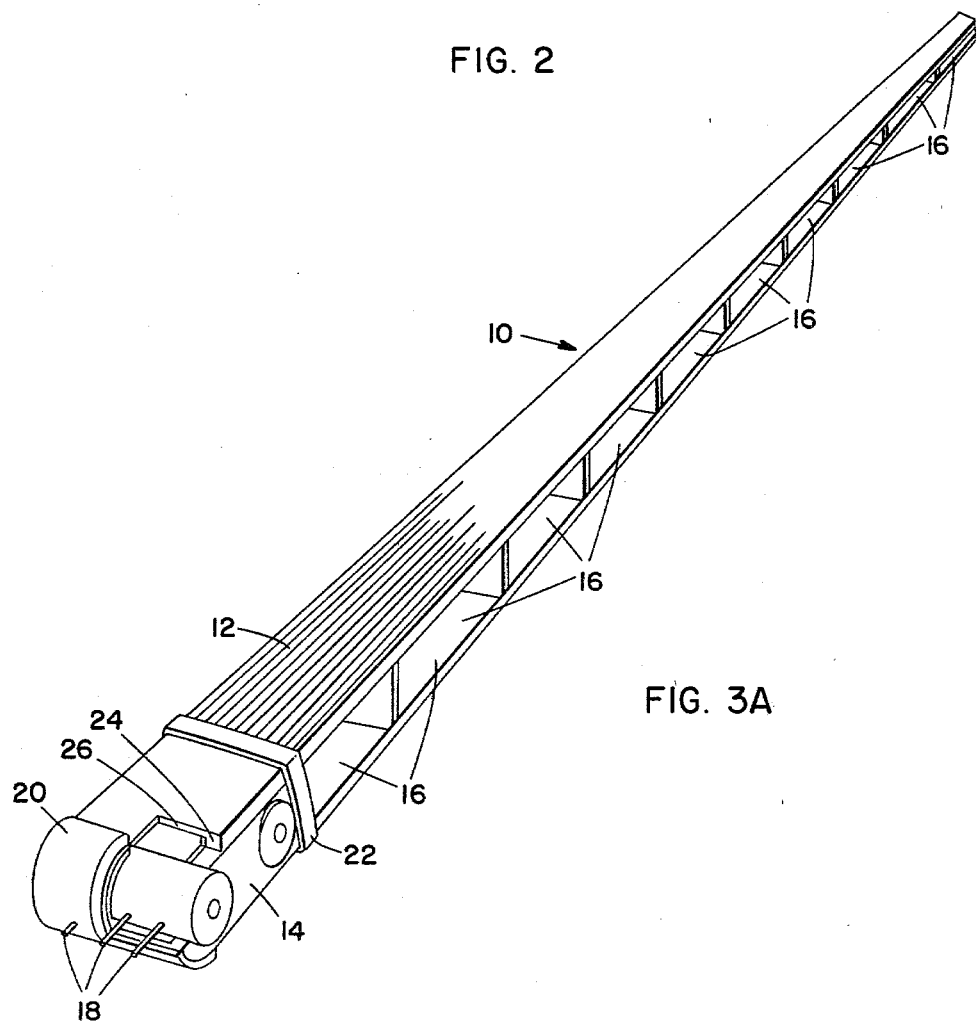
FIG. 3A shows a partially broken-away view of the channels of the present invention in the form of a spar support member for a wind blade.
Figure 3B:
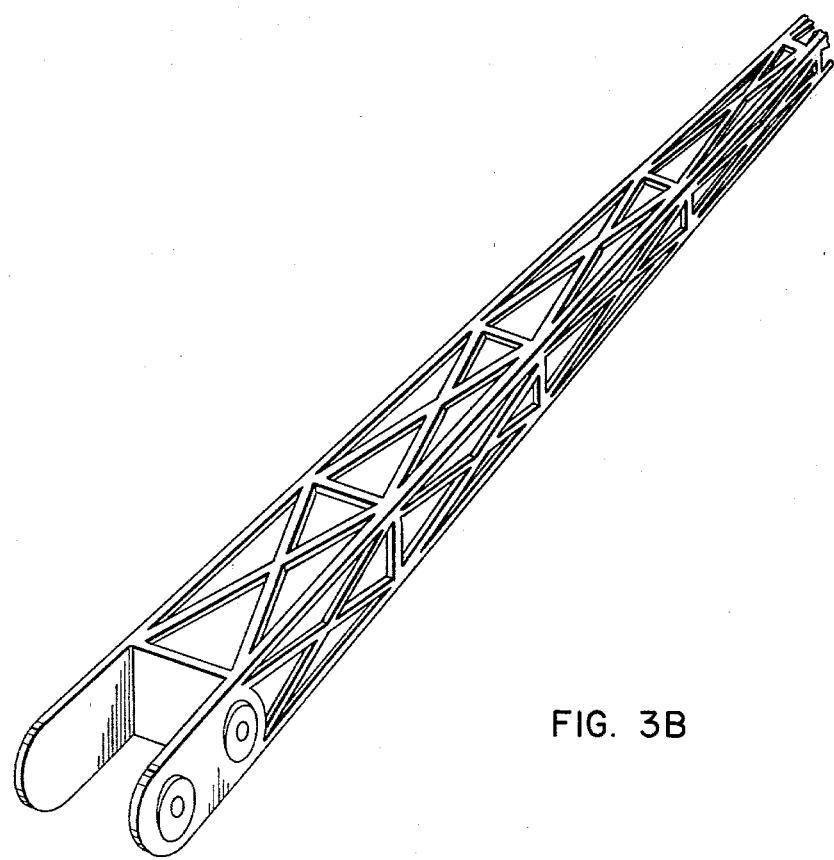
FIG. 3B shows the channels of the present invention in the form of a spar support with integrally wound unidirectional fiber cross-bracing.
Figure 4:
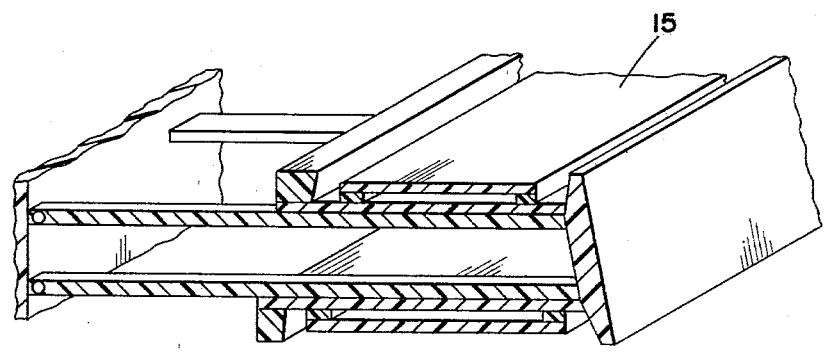
FIG. 4 represents a spar cell forming member around which the resin-impregnated fiber is wound to form the spar support member of FIG. 3.

A similar result could be obtained at lower cost by wrapping the completed wound central support member (10) of FIG. 3A with narrow strips of unidirection fiber tape in a resin binder. By alternating the strips at equal but opposite angles to the bladewise direction, such as +45° and −45°, an increase in twisting resistance and shear stiffness should be obtained at a lower cost.

In addition, the four unidirectional fiber composite bars of the present invention could be joined to form a unitary member in other ways. For instance, two pairs of bars could be separately formed and then positioned and wrapped with cloth laminate. Alternatively, the channel pairs could be properly positioned and then wound with fiber, in order to form a kind of channel web. Since either of these constructions would involve cutting away excess material or retaining a substantial amount of unnecessary weight, the previously described design is believed to be superior for use in a light and economical wind blade.

The method of forming the skins in an open mold allows the placement of stiffeners on the inside surface of the blade with relative ease. Laminated skins, as described, are acceptable in the wind blade embodiment described, and are considered preferable because of their ease of construction, the availability of materials and their economy. However, other construction materials may be substituted, such as prepreg sheets of unidirectional fiber. This would allow surface skin members of increased strength without higher weight.

What I claim and desire to protect by Letters Patent is:

1. A bifoil blade having a longitudinal direction extending between its root and tip ends, a lateral direction extending between its leading and trailing edges, and an upstanding direction extending between its first and second airfoil-shaped surfaces, said blade comprising:
   an upper airfoil-shaped skin having an outer surface that substantially defines said first airfoil-shaped surface;
   a lower airfoil shaped skin having an outer surface that substantially defines said second airfoil-shaped surface, said upper and lower airfoil-shaped skins (i) joining together at said leading edge of said blade and at said trailing edge of said blade and (ii) defining a cavity between said upper and lower airfoil-shaped skins;
   a filament wound central support structure carried in said cavity, said central support structure being affixed in said cavity to the respective inner surfaces of said upper and lower airfoil shaped skins;
   said central support structure being defined by (i) laterally spaced, leading and trailing composite channels that longitudinally span said cavity in respective leading and trailing relation and (ii) a plurality of longitudinally spaced, cross-channel composite webs connecting said leading and trailing composite channels with one another;
   said leading composite channel being defined by (i) upstandingly spaced, first and second leading composite bars longitudinally spanning said leading composite channel and (ii) a leading composite channel web connecting said first and second leading composite bars, said leading composite channel web being laterally thinner than those portions of said first and second leading composite bars that are respectively upstandingly adjacent said leading composite channel web;
   said trailing composite channel being defined by (i) upstandingly spaced, first and second trailing composite bars longitudinally spanning said trailing composite channel and (ii) a trailing composite channel web connecting said first and second trailing composite bars, said trailing composite channel web being laterally thinner than those portions of said first and second leading composite bars that are respectively upstandingly adjacent said trailing composite channel web.

2. A bifoil blade in accordance with claim 1, wherein unidirectional fiber longitudinally spans said central support structure respectively along each of said first and second leading and each of said first and second trailing composite bars.

3. A bifoil blade in accordance with claim 1, wherein unidirectional fiber longitudinally spans said support structure respectively along each of said leading and trailing composite webs.

4. A bifoil blade in accordance with claims 1, 2 or 3 further comprising a unidirectional fiber composite trailing edge spline (i) positioned between said central support structure and said trailing edge and (ii) spanning said cavity along said trailing edge.

5. A bifoil blade in accordance with claim 4 wherein said central support structure tapers from said root to said tip of said blade.

6. A bifoil blade in accordance with claim 5, wherein said central support structure tapers from said leading edge to said trailing edge of said blade.

7. A bifoil blade in accordance with claim 6, wherein unidirectional fiber spans each of said longitudinally spaced, cross channel composite webs respectively between said laterally spaced composite channels.

8. A blade in accordance with claim 7, wherein said upper airfoil-shaped skin laps said lower airfoil skin along said leading edge.

9. A blade in accordance with claim 7, wherein said inner surfaces of said upper and lower airfoil-shaped skins overlap a strip longitudinally spanning said leading edge that has an integral rib projecting from said strip between said upper and lower airfoil-shaped skins.

10. A blade in accordance with claim 9, wherein said rib is integral with a second strip that overlaps said outer surfaces of said upper and lower airfoil shaped skins along said leading edge.

* * * * *